Oct. 19, 1948.        A. J. COX        2,451,922
COAL DRILL AND CHUCK
Filed June 14, 1945
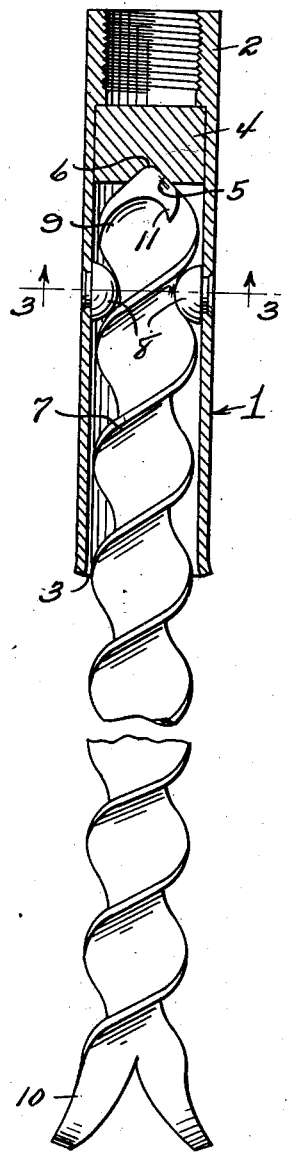
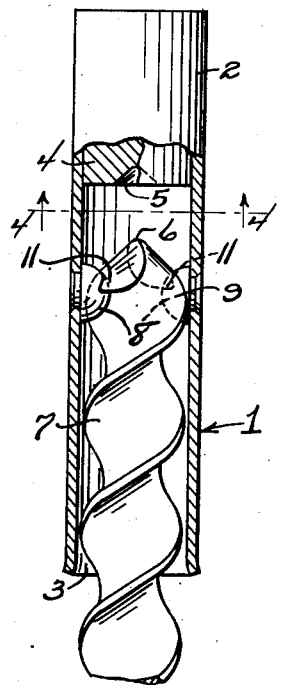
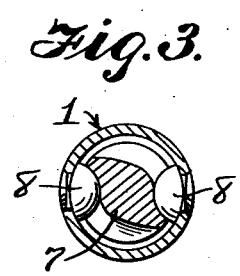
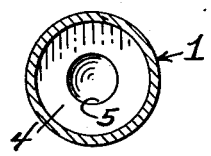
INVENTOR.
Andrew J. Cox
BY Victor J. Evans & Co.
ATTORNEYS Patented Oct. 19, 1948

2,451,922

UNITED STATES PATENT OFFICE 2,451,922

COAL DRILL AND CHUCK

Andrew J. Cox, Falls Mills, Va., assignor of one-half to Renick J. Cox, Bluefield, Va.

Application June 14, 1945, Serial No. 599,408

1 Claim. (Cl. 279—103)

My present invention, in its broad aspect, has reference to improvements in coal drills, and more particularly, it is my purpose to provide improved means for drawing the drill out of the holes, improved means for aligning and driving the drill, improved means whereby the drill may be quickly detached from the chuck, and also improved means whereby the drill may be drawn out of a hole irrespective of hard drilling situations, as for instance, when coal cleanings are wet and mucky.

In the mining of coal, it is ordinary practice to drill from four to seven holes to about an eight or ten foot depth, and if there is a loading machine following the cutting, the drill crew must do this work very quickly, and many changes of bits are necessary. My device may be disconnected and the bit changed very quickly, and at the same time positive, sturdy and efficient means are provided for driving and retarding or withdrawing the bit, and the bit is maintained in alignment. Furthermore, the operator does not have to handle the drill from the time the hole is started until the bit is withdrawn from the hole, at which time if it is necessary to change the bit, it is merely given a short left turn and pulled forward out of the chuck—in coal drilling all drills turn right.

Other and equally important objects and advantages of my invention will be apparent from the following description and drawings, and it is pointed out that changes in form, size, shape, materials, and construction and arrangement of parts may be made and are within the purview of my broad inventive concept and the scope of the appended claim.

In the drawings wherein I have illustrated a preferred form of my invention:

Figure 1 is a vertical section through a chuck and coal mining drill bit, same being shown in drilling relationship;

Figure 2 is avertical section showing the parts in drill withdrawing or retarding relationship;

Figure 3 is a section on the line 3—3 of Figure 1, and

Figure 4 is a section on the line 4—4 of Figure 2.

In the drawings wherein like characters of reference are used designate like or similar parts:

The numeral 1 designates a cylindrical drill chuck having a thickened threaded end 2 for attachment to the drill drive shaft (not shown) and a slightly flared mouth 3. A drill stop 4 is mounted in the chuck adjacent the threaded end 2 and has a centered countersunk depression 5 into which the end 6 of the drill bit 7 is seated to properly align the bit at all times.

At a point midway the ends of the chuck are diametrically opposed round headed rivets 8; the heads being directed inwardly which engage the drill bit 7 in the spiral grooves. The drill bit is of the coal drill type and turns to the right in the drilling operation, and at the end 9 opposite to the entering end 10, the drill is provided with opposed slightly hooked lugs 11 which engage the rivets to withdraw or retard the drill after the manner shown in Figure 2. In drilling, the parts assume the position show in Figure 1. In detaching, the drill is given a short turn to the left and drawn from the mouth of the chuck.

From the foregoing, it is believed that the operation and advantages of my invention will be apparent, but it is again emphasized that interpretation of the scope of my invention should only be conclusive when made in the light of the subjoined claim.

I claim:

In a device of the character described, the provision of a drill chuck, a pair of semispherical rivets diametrically opposed in the chuck, a drill and a pair of slightly hooked lugs formed on the drill and adapted to engage with the rivets when withdrawing the drill from a hole.

ANDREW J. COX.

REFERENCES CITED

The following references are of record in the file of this patent:

UNITED STATES PATENTS

| Number | Name | Date |
|---|---|---|
| 260,314 | Parks et al. | June 27, 1882 |

FOREIGN PATENTS

| Number | Country | Date |
|---|---|---|
| 26,810 | Great Britain | 1909 |
| 10,743 | Great Britain | 1913 |